April 22, 1952 R. F. ONSRUD 2,593,691
AUTOMATIC GLUING MACHINE
Filed Jan. 17, 1949 6 Sheets-Sheet 1

INVENTOR:
RUDOLPH F. ONSRUD
BY Rummler, Rummler & Snow
ATT'YS

April 22, 1952  R. F. ONSRUD  2,593,691
AUTOMATIC GLUING MACHINE
Filed Jan. 17, 1949  6 Sheets-Sheet 3

FIG. 3

INVENTOR:
RUDOLPH F. ONSRUD
BY
ATT'YS

April 22, 1952  R. F. ONSRUD  2,593,691
AUTOMATIC GLUING MACHINE
Filed Jan. 17, 1949  6 Sheets-Sheet 4

INVENTOR:
RUDOLPH F ONSRUD
BY
ATT'YS

April 22, 1952 R. F. ONSRUD 2,593,691
AUTOMATIC GLUING MACHINE
Filed Jan. 17, 1949 6 Sheets-Sheet 5

FIG. 9

INVENTOR:
RUDOLPH F. ONSRUD
BY
ATT'YS

Patented Apr. 22, 1952

2,593,691

UNITED STATES PATENT OFFICE 2,593,691

AUTOMATIC GLUING MACHINE

Rudolph F. Onsrud, Chicago, Ill., assignor to Onsrud Machine Works, Inc., Chicago, Ill., a corporation of Illinois Application January 17, 1949, Serial No. 71,266

9 Claims. (Cl. 144—281)

This invention relates to gluing machines and particularly to such devices in which the bonding is done with a thermosetting glue and wherein the work, after being clamped, is subjected to a heating process whereby the glue substance is cured or set.

The main objects of this invention are to provide an improved gluing machine for use with thermosetting glue substances; to provide such a machine having an improved work clamping arrangement wherein the work is held flat between clamping platens and is simultaneously subjected to pressure in a direction normal to the plane of the surfaces being joined; to provide an improved gluing machine having a plurality of shiftable work handling and clamping sections whereby the machine may be in continuous operation; and to provide such a machine in which the work handling sections are shifted successively from station to station for the performance of successive operations which together constitute an operative cycle of the machine.

Other principal objects are to provide an improved gluing machine having vertically and horizontally acting clamping mechanisms which operate in predetermined timed relation with each other; to provide such a machine in which the operation of the clamping mechanisms, in timed relation with each other, is wholly automatic and happens as the work holding sections shift from station to station; to provide such a machine in which one work section is in operation to clamp the work and set or cure the glue between the work joints while another section is in open inoperative position for removal of finished work and the insertion of new work to be glued; to provide an improved automatic gluing machine in which thermosetting glue substances can be set by dielectric heating during very short time intervals; and to provide an improved continuous gluing machine in which work is automatically clamped, subjected to a radio frequency electrical heating influence and then released at predetermined periods during each cycle of operation of the machine.

A specific embodiment of this invention is shown in the accompanying drawings in which.

The dielectric gluing machine herein shown and described is an apparatus designed to perform a glue setting or curing operation in non-conductive materials by means of heat produced in an electrostatic field, or diathermically, between cold coacting platens which automatically clamp and hold the work under pressure after the work surfaces to be bonded have been coated with a thermosetting glue substance, the electrostatic or diathermic field being produced by radio frequency electrical oscillations between electrodes disposed in the coacting platens one of which is insulated from the machine and the other of which is grounded to the machine frame so that there is no direct flow of current through or between the platens as in the case of ordinary resistance circuits. Thus, with such a machine, the radio frequency electrical oscillations may be confined to elements of only one portion of the machine while the remaining portion of the machine is free of any electrical charge, current, or static and hence is safe for working by the operator.

As herein employed the term "diathermic field" is intended to mean a space permeated by radio frequency electrical oscillations produced between opposing electrodes in a manner similar to that employed in diathermic apparatus for medical use. In such a field there is no appreciable flow of electric current but rather the field contains high frequency electrical waves or oscillations of electrostatic flux which causes heat to be produced in substances within the field more or less proportional to the inductive capacity of such substances. The work to be glued in the machine is usually of a dielectric material and the heating process is known in the art as dielectric heating. The machine is so designated to distinguish from the ordinary hot plate press and other devices in which heat is produced through resistance in the flow of electrical current.

In the form shown in the drawings, the improved gluing machine comprises a pair of rectangular horizontally disposed work carrying platens A suitably mounted on the upper surface of a rotatable table 1, the platens A being disposed on opposite sides of the center of rotation of the table 1 and arranged with 180° of angular displacement between them so that they are opposite and parallel with each other. A pair of clamping platens B are also provided, one above each of the work carrying platens A and mounted for opening and closing action like the covers of a book. Thus each clamping platen B may coact with its respective work carrying platen A to securely clamp and hold the work to be glued, which work is assembled on the surface of the carrying platen A.

As shown, the work table 1 is mounted on a suitable stand or base 2 so as to be raised a convenient distance above the floor to permit the operator to work efficiently as though each of the carrying platens A were a work table. The rotatable table 1 is suitably supported on bearings, not shown, contained within the base 2 and the drive for turning the table is obtained by suitable means within the base and connected through a gearbox 3. The main drive shaft of the gear box 3 extends outwardly therefrom and into a double acting clutch 4, which is arranged to also serve as a brake. The outer end of the clutch is then connected to a shaft 5 which, through a coupling 6, is connected to the shaft extension of a driving motor 7. As shown the clutch 4 is actuated by a double acting air cylinder 8 which, in turn, is mounted on the gear box 3 and is operated by a control circuit which will be hereafter described. Thus the motor 7, through the shaft 5, the clutch 4 and the gear box 3, operates to rotate the table 1, and through operation of the clutch 4 drives the table 1 intermittently so that the table 1 will turn through predetermined increments of a complete revolution as will be hereafter described.

Figures 2, 4:
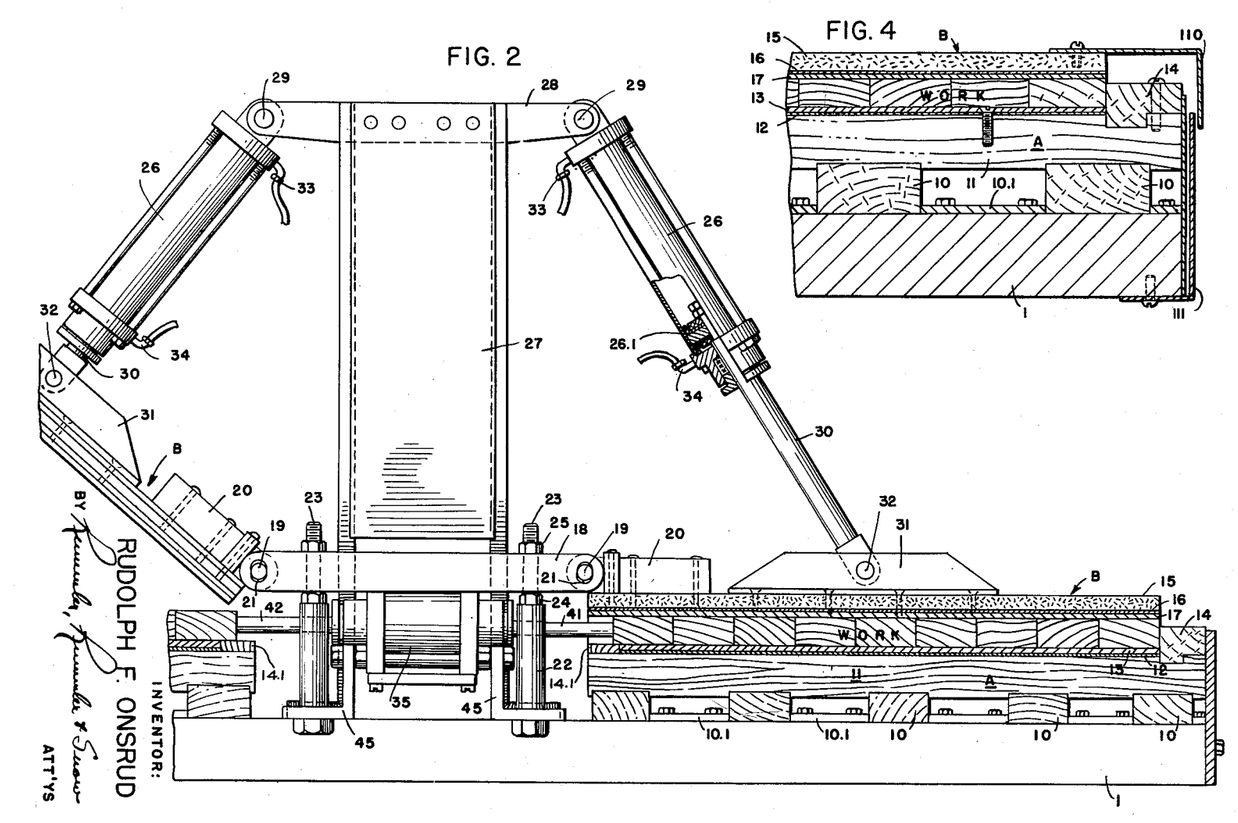
Fig. 2 is a side elevation of the machine as taken on line 2—2 of Fig. 1, with parts of one section broken away, showing the arrangement of the work holding platens and the clamping mechanism.
Fig. 4 is an enlarged fragmentary sectional view as taken on line 4—4 of Fig. 3 and showing details of the platen construction.

Referring to Fig. 2, it will be seen that the work carrying platen A is a composite structure built up on the top surface of the table 1 and rigidly secured thereto. This structure comprises first a plurality of wooden beams 10 laid parallel with the centerline between the working sections of the table in laterally spaced relation across the top surface of the table 1; and then a second tier of wooden beams 11, laid transversely of the beams 10 and likewise spaced laterally from each other. The beams 10, which in the present embodiment are shown as two by fours, are preferably laid on their sides and the cross beams 11, which may also be two by fours, are laid on their edges. Preferably the upper crossbeams 11 are notched to receive the upper faces of the beams 10 as indicated in Fig. 2, so that the beams 11 will be locked against longitudinal displacement, and the beams 10 are fastened directly to the table top between spacer plates 10.1 which are suitably bolted to the table. The beams 11 are fastened only to the beams 10 so that there will be no through metallic connection from the top surfaces of beams 11 to the table 1.

On this platform, or lattice, of wooden beams is a cover sheet of aluminum plate 12 which has an area equivalent to the desired working surface area of the carrying platen A, and on top of the cover sheet 12 is a work surface comprising a plurality of aluminum strips 13 which are laid parallel with the crossbeams 11 and spaced laterally with substantially the same spacing as the crossbeams 11. The aluminum strips 13 and the cover plate 12 are suitably secured by means of screws which extend into the crossbeams 11.

As shown in Fig. 2, the work to be glued is assembled on the upper surface of the work carrying platen thus formed, and a stop strip 14 is secured along the outer or front edge of the work carrying platen to serve as an abutment against which the work may be aligned and clamped. The stop strip 14 is thicker along its inner side which thicker portion is set into a notch at the front ends of the beams 11 and the stop member is then bolted directly to the beams 11 in order to provide a firm solid structure to withstand the lateral clamping action. As shown the plate 12 and strips 13 terminate at the stop strip 14 and engage the same edgewise. Also, an insulating strip 14.1 of wood, or other dielectric material, is disposed along the rearward edge of the carrying platen to shield the inner edge and ends of the plate 12 and the metal strips 13, the strip 14.1 being of the same thickness as the combined thickness of the metal plate and strips and being a continuation of the work carrying surface.

The work carrying platens on each side of the gluing machine are constructed in the same manner and are rigidly mounted on the table top so as to be substantially an integral part therewith and provide a firm and stable base upon and against which the work can be clamped.

As shown in Fig. 2, each clamping platen B is of substantially the same area and size as the respective work carrying platen A and comprises a relatively heavy sheet 15 of dielectric material, such as "masonite" or "transite," on the bottom face of which is mounted an aluminum plate 16 and a plurality of aluminum strips 17 to provide a work engaging surface. The aluminum strips 17 extend transversely of the clamping platen parallel with the strips 13 of the work carrying platen and are spaced substantially the same distance apart. The aluminum plate 16 covers the entire bottom surface of the clamping platen and all the parts are suitably bolted together by flathead bolts which are countersunk into the work engaging surfaces of the aluminum strips 17 and which extend through the strips and plate to the upper side of the dielectric sheet 15 where they are secured by nuts.

Each clamping platen thus formed is hingedly connected, at the ends of its inner or rearward edge, to a heavy support bar 18 which is mounted on and above the table 1, the hinge connection being provided by pintles 19 which are mounted on relatively heavy hinge bracket 20 extending along the rearward edge of the clamping platen B and suitably bolted or secured thereto, the pintles 19 projecting horizontally from the hinge bracket through vertically elongated openings 21 in the ends of the support bar 18. The support bars 18 are disposed at the ends of the platens and each is supported from the table 1 on a pair of upwardly projecting columns 22 rigidly connected to the table and spaced equally on each side of the centerline thereof. As shown, the columns 22 are each provided with a threaded or boltlike upper end 23 which extends through a respective vertical opening in the support bar 18, the threaded extension being provided with nuts 24 and 25 disposed respectively below and above the support bar to provide a means for adjusting the vertical height of the support bar above the table 1.

Thus the clamping platen B may be swung vertically on its hinge pintles 19, to raise and lower the clamping platen to permit the placing or removal of work on the carrier platen A, and the height of the hinged connection at the inner or rearward edge of the clamping platen may be adjusted to accommodate work of different thicknesses. The vertical elongation of the pintle openings 21 in the support bars 18 is provided to permit sufficient play in the clamping platen hinge connection to permit the clamping platen being seated squarely against the work even though the thickness of the work may vary slightly from the means for which the height of the support bar 18 is set.

In the form shown, the clamping platens B are actuated by operating means comprising a plurality of pneumatic pressure devices or air cylinders 26, which are hingedly connected to the respective arms of T-shaped support columns 27 extending vertically from the table top. As shown there are three such support columns, one being located at the center of the table and the others being spaced laterally from the center of the table between the platens, at locations adjacent the ends of the platens. These support columns 27 are rigidly attached to the table top by bolts extending through flanged feet on the bottom of the columns and the arms at the upper ends of the columns are provided by a pair of crossbars 28 arranged to project laterally from each side of the column 27 and to overhang the platens. Each of the power means 26 is pivotally connected between the respective outwardly projecting ends of the crossbars 28 on a pivot pin 29 and extend downwardly and outwardly therefrom toward the center of the clamping platen B.

Each power cylinder 26 comprises a piston 26.1 suitably mounted on the upper end of a piston rod 30 which in turn projects from the cylinder through a suitable end cap or gland and has its lower end pivotally connected between a pair of attachment brackets 31 by means of a pin 32. The attachment brackets 31 are in turn located substantially midway of the width of the clamping platen and are securely fastened thereto by suitable flat head bolts or screws which extend upwardly from the platen so that their flat heads will face toward the work.

Figure 1:
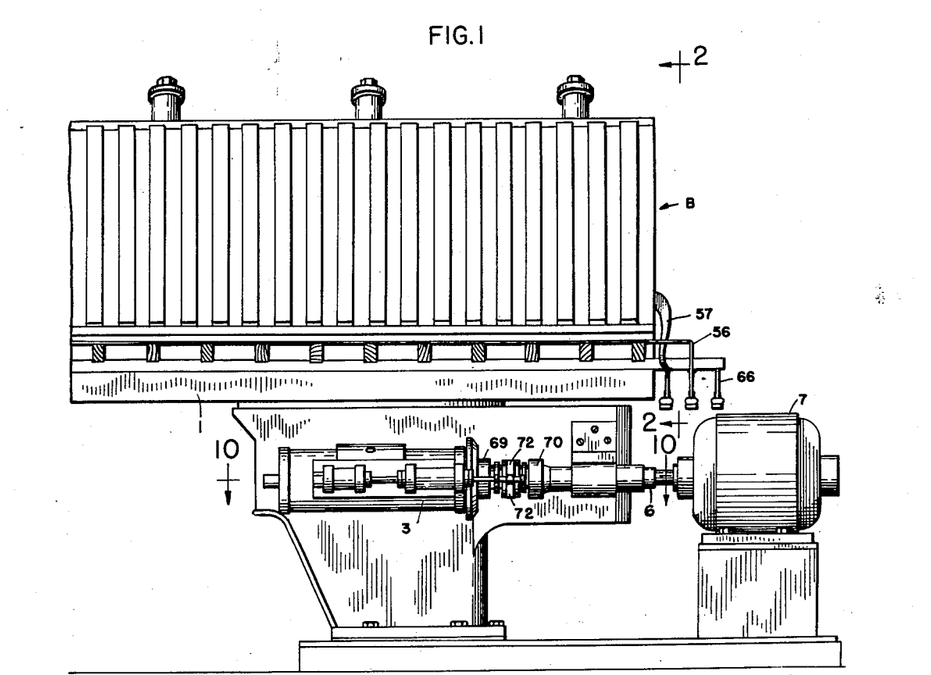
Figure 1 is a front elevation of the improved gluing machine.

The pressure cylinders 26 are constructed as double acting devices in which the piston 26.1 secured on the end of the respective piston rod 30, may be moved in either direction by means of air pressure and the arrangement is such that, when the piston rods 30 are in fully extended position, the clamping platen B will be closed and in coacting clamping relation with respect to the work holding platen A so as to clamp the work between the platens under pressure. When the pressure cylinders 26 are operated in the opposite direction, the piston rods are pulled upwardly into the cylinder so that a lifting action is applied to the clamping platen B whereby the same is raised or elevated to the position shown in Fig. 1 or at the left hand side of Fig. 2. The actuating air pressure is supplied at the ends of the power cylinders, in the well known manner, through suitable air connections 33 and 34 by means of a control circuit which will be hereafter described.

Since the clamping platens A and B clamp the work in a vertical direction to hold it flat during the gluing operation, it is also necessary to apply horizontal clamping pressure on the work so that vertical joints in the work will be held tightly together. Such horizontal clamping action is accomplished by means of a plurality of separate clamping devices disposed along the rearward edges of the platens and arranged to act horizontally between the platens to force the work pieces tightly against each other and toward the stop strip 14 at the forward edge of the work carrying platen A.

Figure 5:
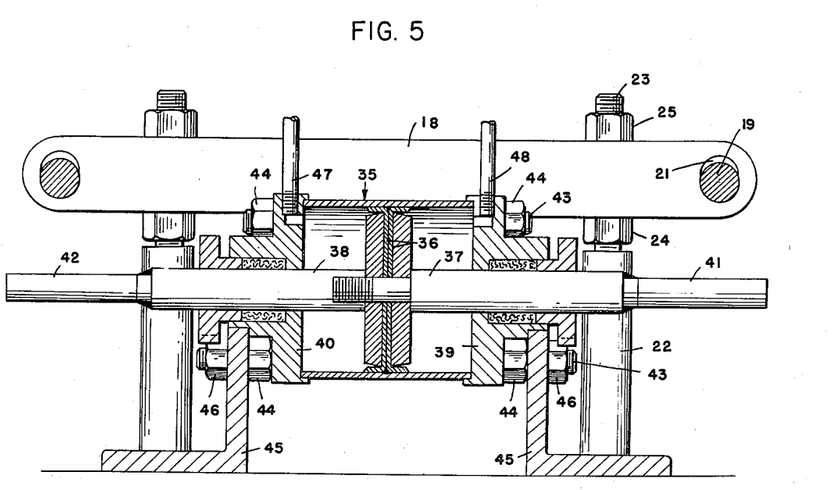
Fig. 5 is a sectional view as taken on line 5—5 of Fig. 3.
Figure 6:
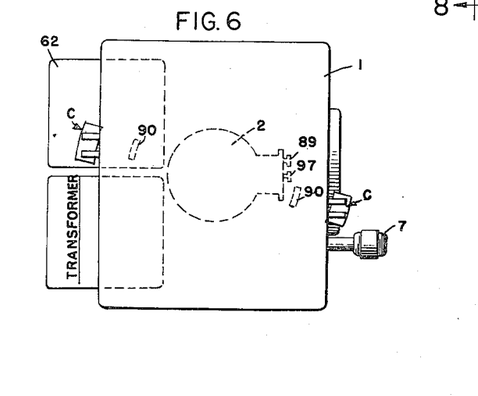
Fig. 6 is a schematic plan view of the machine showing the arrangement of the high frequency generating apparatus relative to the machine, the disposition of the electrical contacts for energizing one section only of the machine during its operation, and the general location of the valves for controlling table rotation.

In the form shown, these laterally acting clamping means are designed to act independently of the platens and comprise a plurality of double acting air cylinders 35, arranged in spaced relation along the centerline of the table 1 between the work carrying platens A. Each air cylinder 35 contains a double acting piston 36 (see Fig. 5) having piston rods 37 and 38 extending from each side through suitable glands in the end caps 39 and 40, which close the ends of the cylinder 35. Each of the piston rods 37 and 38 is provided on its outer end with a rectangular pusher blade 41 and 42 respectively, arranged to extend between the coacting platens A and B to engage the work and force it under pressure toward the stop strip 14 on the platens A.

Figure 7:
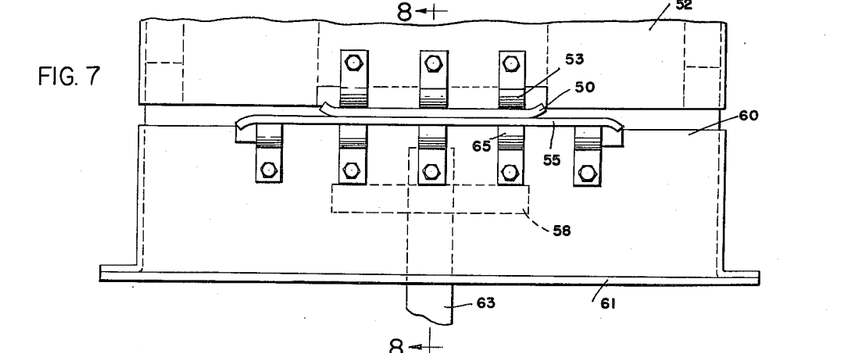
Fig. 7 is a side elevation showing the arrangement of electrical contacts between the gluing machine and the high frequency oscillator.
Figure 8:
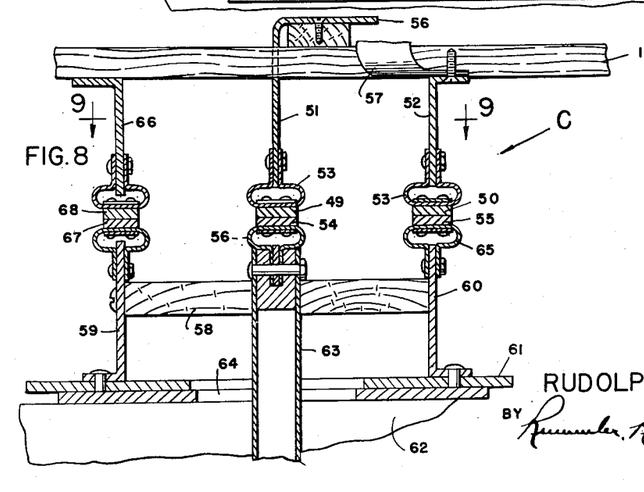
Fig. 8 is a sectional view of the same as taken on line 8—8 of Fig. 7.
Figure 9:
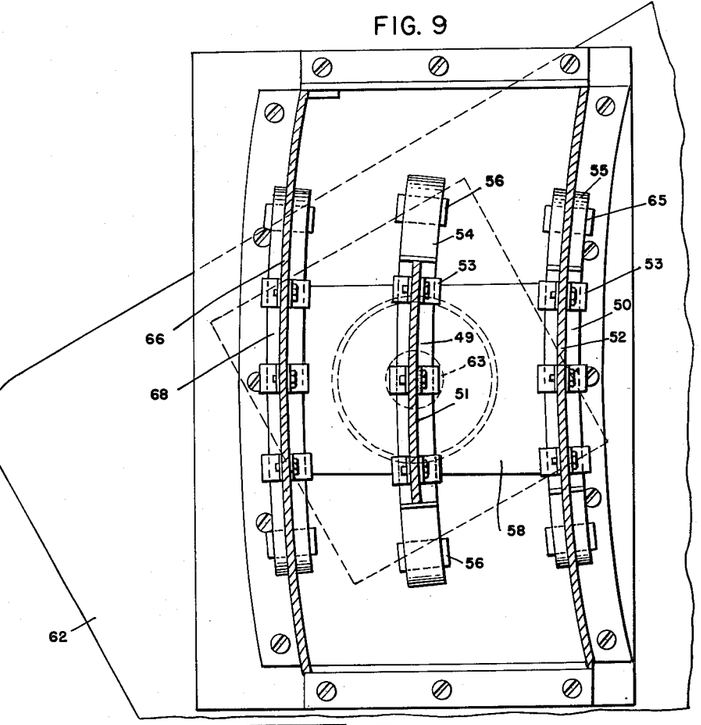
Fig. 9 is a sectional plan view of the same as taken on line 9—9 of Fig. 8.

As shown, the caps or end members 39 and 40, on each of the clamp cylinders 35, are secured on the ends of the cylinders by means of tie bolts 43 extending between the cap members on the outside of the respective cylinder body, the tie bolts having nuts 44 at each end by which the cylinder end caps are drawn toward each other, and the several cylinders are mounted between the upstanding legs of opposed angle bars 45 which extend parallel with the centerline of the table 1 between the work carrying platens A. For mounting purposes the lowermost tie bolts 43 are longer than the upper tie bolts so as to extend through suitable openings provided in the vertical legs of the angle bars 45, where they are secured by means of nuts 46. The angle irons 45 are positioned back to back as shown in Figs. 2 and 7 and extend transversely of the table 1, being interrupted only by the bases of the columns 27, and at those places where the angle irons 45 are interrupted the respective laterally acting clamp cylinders 35 are bridged by a tie plate, not shown, so that they will mutually support each other.

Figure 3:
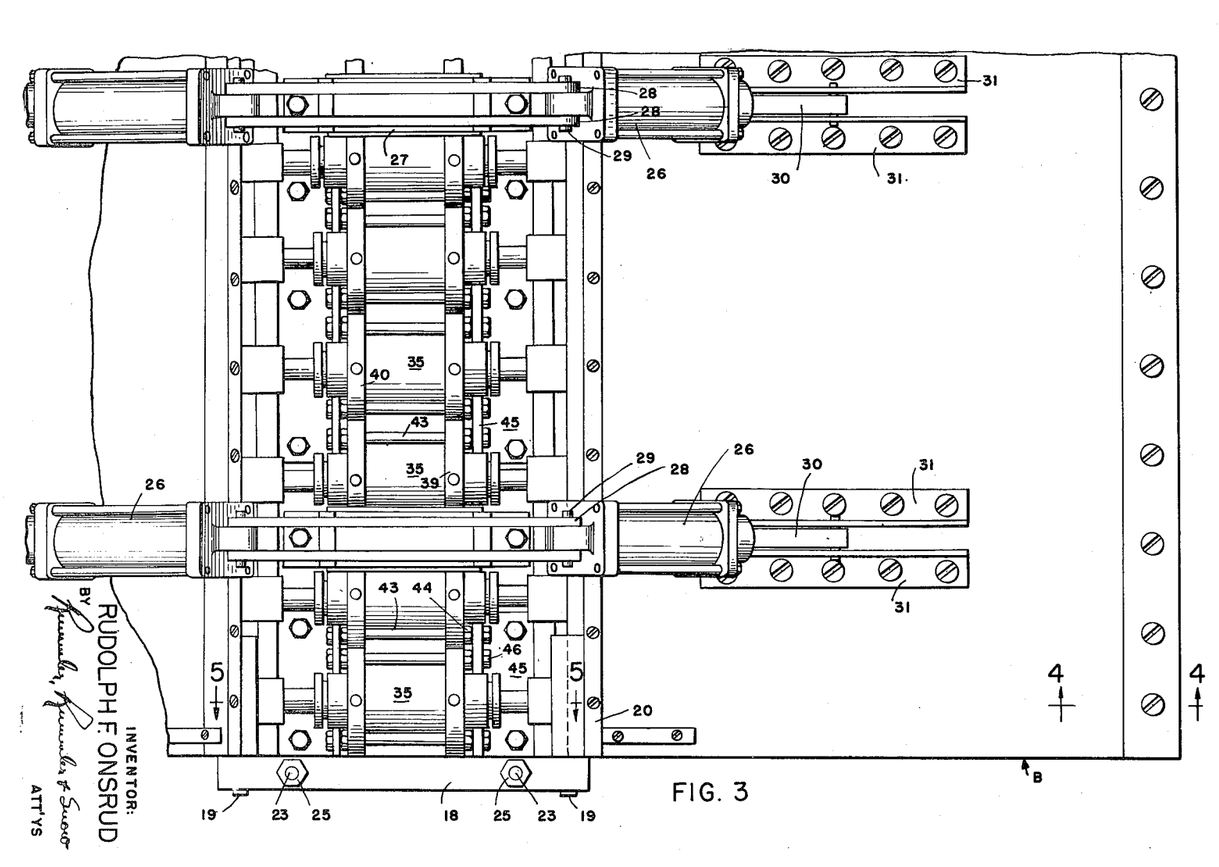
Fig. 3 is a fragmentary plan view of the machine showing the disposition and operative arrangement of the work clamping mechanism.

As shown in Fig. 3, the laterally acting clamp means are disposed as close to each other as possible along the centerline of the table so that a maximum number of the clamps may be provided. Also, as shown in Fig. 7, each of the air cylinders 35 is provided with a pair of air connections 47 and 48, which enter the end caps 39 and 40 respectively and through internal passages in the end caps have communications with the respective sides of the piston 36. The clamp cylinders 35 are thus arranged to be operated in either direction, that is, either to the right or to the left. As shown in Fig. 7, the piston 36 is in its neutral position.

In the operation of these independent clamps, each piston 36 is actuated to move toward the platens which are coacting to clamp the work between them, thus exerting a lateral clamping pressure against the work in process while simultaneously releasing the clamping pressure from the work on the opposite side of the table where the clamping platen is being raised. This actuation of the laterally acting clamp means is had in a definitely predetermined timed relation with the operation of the clamping platens B as will be hereafter explained in connection with the control and operation of the gluing machine as a whole.

When the platens A and B are in closed coacting position to clamp and hold the work to be glued, the diathermic field by which the glue is heated and set is generated between the platens through the energization of the aluminum sheets or plates 12 and 16 which are contained in the structures of the work holding platens A and the clamping platens B. The respective plates 12 and 16 serve as the electrodes between which electrical energy is alternated at a radio frequency so as to produce heat in the substance held between them and the arrangement of the gluing machine is such that the plates are energized only when the coacting platens have reached a predetermined station or position in the cycle of operation of the machine. This is accomplished by providing contact means including a pair of contact shoes suitably mounted on each of the work carrying platens A and adjacent an inner corner thereof, which shoes are connected electrically to the electrode plates of the respective platens. The contact means, indicated generally by the letter C, are arranged to engage a fixedly positioned pair of like contact members which are independent of the gluing machine and are respectively connected to the source of high frequency electrical oscillations. Thus in the rotation of the table 1, from station to station in the cycle of operation of the machine, the contact means C on the table will engage the fixed contact members providing the source of high frequency energy only when the table reaches a predetermined position.

An arrangement for the contact shoes and the fixed contact members for energizing the electrodes of the gluing machine is shown in Figs. 6 to 9 inclusive, and as shown two contact shoes 49 and 50 are provided for each pair of platens. These shoes are mounted on laterally extending portions of the work carrying platen base members 10 and are supported therefrom by suitable brackets 51 and 52 made of sheet aluminum so as to serve as conductors, the shoes 49 and 50 being connected to the respective brackets 51 and 52 by means of a plurality of U-shaped spring clips 53 which afford vertical resiliency to the connection in order to assure a tight wiping contact with the stationary contact members 54 and 55.

The aluminum bracket which supports the contact shoe 49 is provided with a lateral extension 56 which leads directly to the aluminum plate 12 contained in the respective work carrying platen A; and the bracket 52, which supports the contact shoe 50, is provided with a flexible strap conductor 57 which leads directly to the clamping platen B where it is electrically connected to the aluminum plate 17 at a point near the hinged edge thereof, the flexible strap conductor 57 being in form of a loop so as to accommodate the vertical swinging movement of the clamping platen as it is raised and lowered in operation.

The contact members 54 and 55 which coact with the shoes 49 and 50 respectively, are preferably mounted directly on the housing of the oscillator from which the high frequency energy is derived. As shown, the member 54 is supported on a plurality of looped springs 56 which in turn are mounted along the upper margin of a horizontal support bar 57 carried by a wooden platform 58 extending laterally between a pair of vertical plates 59 and 60 which project upwardly from a mounting plate 61 fastened to the upper surface of the oscillator casing 62. The contact member 54 is electrically connected to the oscillator by means of a tubular metal member 63 which extends downwardly through the platform 58 and into the oscillator casing through a relatively large top opening 64 in the mounting plate and the casing. This is the hot contact connection and the connecting tube 63 and contact member 54 are, therefore, insulated from all other parts of the structure.

The vertical supporting plate 60 is aligned with the path of the shoe 59 and provides the support for the contact member 55, the latter being mounted on the upper edge of the supporting plate 60 through looped springs 65. Thus, the contact member 55, through its supporting plate 60 provides a positive ground for the high frequency oscillating circuit. The other plate 59 is spaced laterally outward from the hot contact member 54 and extends parallel therewith, and directly above this plate is a shield plate 66 which is mounted on the platen support members 10 and disposed to extend parallel with the plate 59. The purpose of the plates 59 and 66 is to prevent high frequency radiations from passing outwardly beyond the contact shoe area and, in order to completely shield the contact area, a third set of spring mounted slidably engaging elements 67 and 68 are mounted on the adjacent edges of the plates 59 and 66. These elements are of the same construction and arrangement as the contact members 50 and 55 and are substantially coextensive therewith.

As shown, the contact members 54 and 55 are considerably longer in the horizontal direction than the contact shoes 49 and 50 in order to assure that the entire area of the contact shoes will be in engagement with the contact members 54 and 55 when the table 1 is brought to rest at the diathermic glue setting station. Thus, any slight override of the table 1, as it is brought to rest at the heating station, will still leave the contact shoes in full engagement with the contact members of the oscillator equipment. It will be understood that, in accordance with the usual practice in the operation of dielectric heating equipment, the supply of high frequency energy will be under fully automatic control of suitable switching means, not shown, which are arranged to operate the equipment only when the table is in proper position and to shut off the equipment whenever the table is in motion.

As before mentioned, the table 1 is driven by the motor 7 through the clutch 4, which is actuated by a pneumatic mechanism 8 similar to the air cylinders for operating the clamping means. The clutch and its actuating mechanism are shown in detail in Fig. 10 and as shown the clutch is of the multi-disc floating plate type arranged to act in either axial direction from a middle or neutral position. As herein employed the clutch is mounted on the drive shaft of the gear housing 3, the said shaft extending centrally through the clutch from end to end, and power is transmitted through the clutch plates by means of end cups 69 and 70 which are freely rotatable relative to the central shaft when the clutch is in neutral position. The clutch is operated by means of an axially shiftable collar 71, which has a peripheral groove engaged by a shifter fork 72 and the fork is mounted on a bracket 73, by means of a vertical pivot, so that its outer end may be connected to the piston rod 74 of the clutch cylinder 8 and moved horizontally to move the collar 71 toward one or the other of the end cups 69 and 70.

Figure 10:
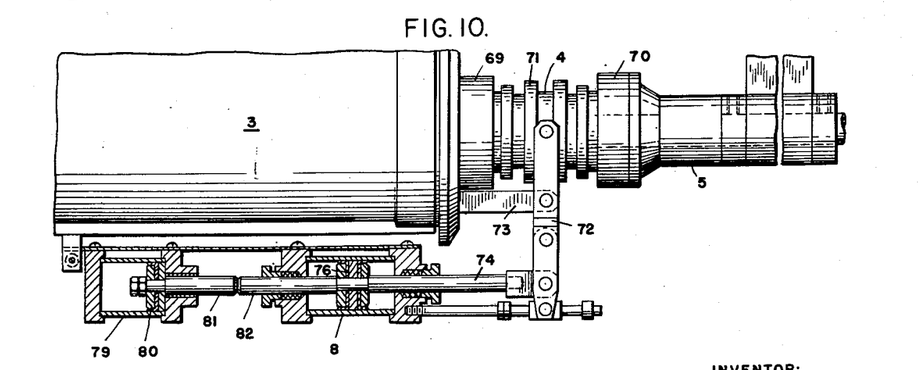
Fig. 10 is a partially sectioned plan view of the table driving and control mechanism, as taken on line 10—10 of Fig. 1.

The driving cup 70 is connected directly to the shaft 5 leading to the motor 7 and when the clutch collar is shifted toward the driving cup 70 the shaft 5 becomes directly coupled to the driving shaft for the gear mechanism 3. The opposite or braking cup 69, however, is connected directly and immovably to the gear housing 3 and by being fixed serves as a brake for the gear mechanism shaft and the glue machine table. Thus, when the clutch collar 71 is shifted toward the end cup 69 the adjacent clutch mechanism provides a multi-disc braking action and the table rotation is stopped.

As shown, the air cylinder 8, for actuating the clutch, is carried by a support plate 75 which is pivotally mounted on the side of the gear housing 3 by means of a vertical connection 75.1 at the rearward end of the plate and the cylinder includes a double acting piston 76 which is mounted on the inner end of the piston rod 74 connected to the clutch fork 73. The stroke of the piston 76 is sufficient to fully actuate the clutch collar in either direction from its middle or neutral position and the cylinder heads are provided with suitable air connections 77 and 78 for supplying air under pressure to either side of the piston to cause its operation.

In the operation of the clutch, however, from a driving connection with the driving cup 70 to a braking connection with the brake cup 69, it is preferable that the clutch be first set to its neutral position and then, after a short period, be shifted to its braking position in order to prevent a too sudden stoppage of table movement. This is accomplished by means of an auxiliary air cylinder 79, which is mounted on the support plate 75 in axial alignment with the clutch cylinder 8, having a single acting piston 80 and a piston rod 81 which projects therefrom toward the clutch cylinder. The clutch cylinder piston 76 is provided with a rearwardly extending piston rod 82, which is of such length as to engage the rod 81 in endwise abutment when the clutch piston 76 is in its middle or neutral position and the rod 81 is fully projected, and since the piston 76 is retracted (to the left in Fig. 10) when the clutch is in driving condition, and the piston 80 is pushed thereby to its retracted position, operation of the auxiliary cylinder will cause the rod 81 to push on the rod 82 until the piston 80 reaches the end of its stroke whereby the piston 76 will be set to its middle position and the clutch shifted to neutral position.

This operation is obtained by supplying air to the auxiliary cylinder only, through an air connection 83, and the full stroke of the piston 80 is only sufficient to move the piston 76 to its middle position. Further actuation of the piston 76, after a predetermined time interval, is had by air supplied to the rearward side of the piston 76, through the air connection 77, whereupon the piston rod 74 is fully extended to shift the clutch collar to the braking position.

Figure 11:
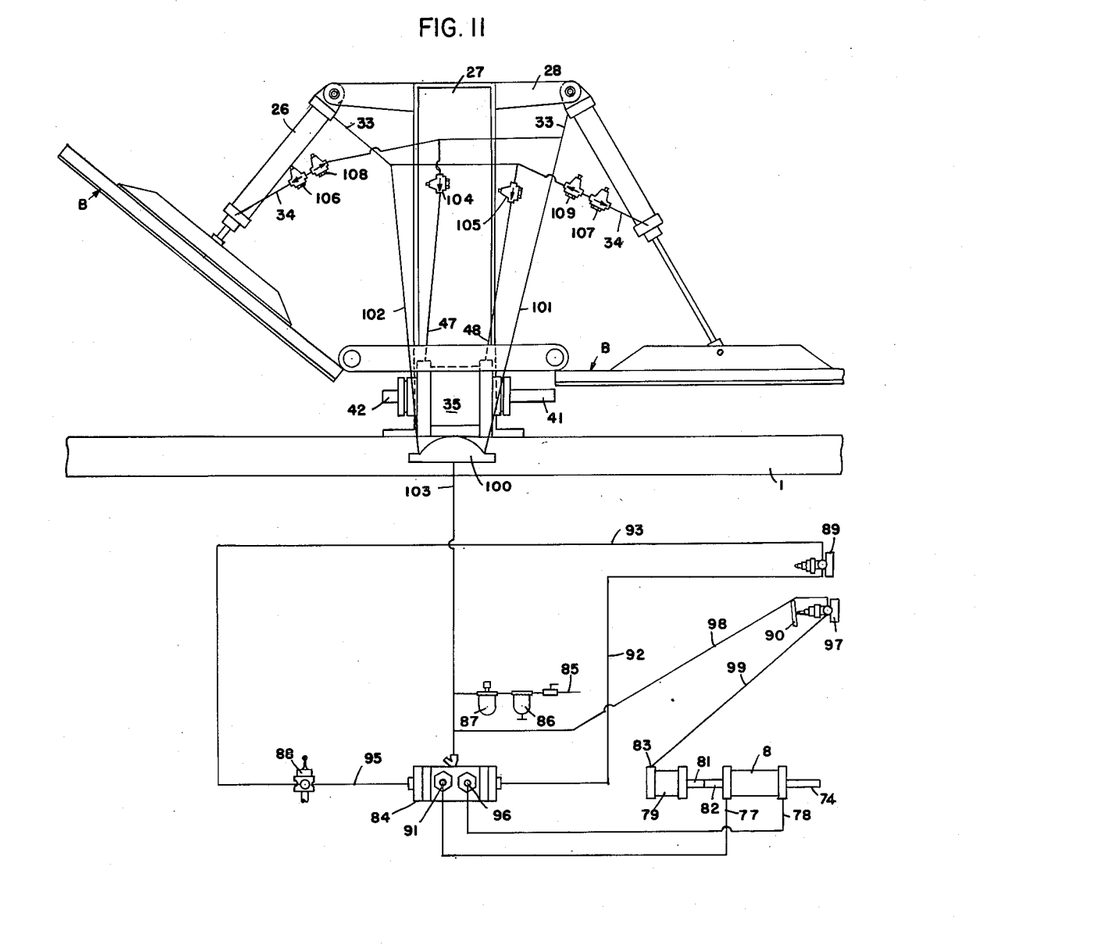
Fig. 11 is a diagrammatic view showing the compressed air operating and control circuit for the gluing machine table drive mechanism and the automatic clamping means.

The operation of the clutch cylinder for controlling the rotation of the work table 1 is governed by a master air valve 84, shown in the control diagram of Fig. 11, to which compressed air at a suitable pressure is supplied by a main line 85 through an air cleaner 86 and an air lubricator 87, and the master valve is operated by a pair of bleeder valves 88 and 89. The valve 88 is suitably mounted and located for operation by the machine operator, usually at the loading station of the machine, and the valve 89 is mounted on the stand Z in a position where it can be actuated by a valve shoe 90 carried by the table 1 on the underside thereof. One such valve shoe is provided for each operating section of the machine.

Normally the clutch is in braking position with the clutch cylinder 8 operated fully to the right under air pressure supplied to the connection 77 from the master valve outlet 91, the master valve being actuated for this purpose by the bleeder valve 89 which bleeds the master valve through the connections 92 and 93 which lead to the valve 88 and thence to atmosphere through the outlet 94. The valve 88 is a three way valve which also connects with and bleeds the opposite side of the master valve through a connection 95, thus one or the other of the connections 93 and 95 is open to atmosphere. Preferably the valve 88 is spring loaded to normally close the connection 95 and open the connection 93 and, since the table is always at rest at one of its operating stations, the valve 89 is held open by the shoe 90 so that the cylinder 8 is energized to perform the braking operation.

When the operator desires to shift or rotate the table the valve 88 is manually operated to close the bleed connection 93 and open the connection 95 which causes the master cylinder to emit compressed air through the outlet 96 and, through the connection 78, supply air pressure to the right hand side of the clutch cylinder 8 so as to shift the piston to the left. In this case the piston moves through its entire stroke immediately and shifts the clutch into driving engagement with the driving cup 70, which is continuously driven by the motor 7, and the table begins to turn.

As the table approaches its next operative station the valve shoe 90 first engages a three way valve 97 and causes it to make connection between an air supply line 98 and a line 99 leading to the auxiliary cylinder connection 83. This supplies air pressure to shift the piston 80 through its full stroke to the right and thereby move the clutch operating piston to its middle or neutral position disengaging the clutch from the driving cup 70. The table then coasts toward the operative station and its momentum decreases until the station is reached at which point the shoe 90 engages the valve 89 and opens the bleed line 92 causing the master valve to supply pressure through the outlet 91 to the cylinder connection 77 so as to shift the piston 76 completely to the right and operate the clutch to its braking position. This stops the table at the desired position and the control circuit has completed its cycle of operation.

The valve 97 is spring loaded to normally bleed the line 99 to atmosphere and close the line 98, and its construction is such that operation by the valve shoe 90 will close the atmospheric outlet and directly connect the line 98 with the line 99.

As shown in Fig. 11, the actuation of the air cylinders 26, which operate the clamping platens B, and the lateral clamp cylinders 35, is controlled by an air valve 100, which is of the rotary type and is operated by rotation of the table 1 so that the respective air cylinders are controlled in accordance with the table position. The operation of the laterally acting clamping means, however, is further controlled by sequence valves so connected and arranged as to cause actuation of the independent clamp cylinders 35 in the proper direction and at the proper time as will be hereafter described. The structural details of the several control valves are not shown since these devices are old and well known in the art, and several types are available on the open market.

In the particular air control arrangement shown the circuit is designed for a two section gluing machine such as that illustrated in the drawings and the center valve 100 has two outlets 101 and 102, one for each section. The air is supplied to the valve from the main line 85 by means of a branch 103 which enters the valve centrally and is directed to one or the other of the outlets according to the table position. As shown in the diagram the right hand section is in clamping position at the heating or glue setting station and the left hand section is at the loading station with the platen B in raised position. The valve 100, which controls the clamping action and the raising or lowering of the platens, is of course designed to act while the sections are moving from station to station so that each section will be in condition for the particular operation when the respective station is reached. Thus the valve outlet line 101 is delivering air under pressure to actuate the clamping mechanism for the right hand section and the line 102, on the opposite side of the valve, is serving as a bleeder.

The outlet line 101 leads directly to a junction with the connection 33 at the upper end of the right hand platen cylinder 26 and a branch leads to the connection 34 at the lower end of the left hand platen cylinder 26 and to the connection 47 at the left side of the horizontal clamp cylinder 35. Thus the actuating air pressure is applied to the right hand platen cylinder 26, to force the platen B downwardly, and is also directed to the left hand platen cylinder to raise the respective platen; and simultaneously the air pressure is directed to the left side of the clamp cylinder 35 to actuate the clamp 41 toward the right. At the same time air is bled from the opposite ends of the respective cylinders through the respective connections 34, 33 and 48 which all lead to the valve line 102 through which the bleed air is released to atmosphere.

In the operation of the clamping devices it is necessary to not only cushion the fall of the right hand platen but also to retard the action of the horizontal clamp cylinder 35 so that its clamp member 41 will not engage the work until a predetermined time after the right hand platen has been activated. This is necessary to prevent upward buckling of the work, under the pressure of the horizontal clamp, until a definite clamping pressure has been applied vertically on the work by the platen B. Also it is necessary that the left hand platen is not released and raised until the horizontal clamp has been actuated to the right to release the lateral pressure on the work contained in the left hand section of the machine. This retarding action is accomplished by means of automatic regulating valves inserted in the connections 34, leading to the lower ends of the platen cylinders 26, and in the connections 47 and 48 leading to the respective sides of the horizontal clamp cylinder 35.

As shown, each of the air lines 47 and 48, for the horizontal cylinder 35, is provided with a sequence valve 104 and 105, respectively, arranged to control the flow of air to the cylinder 35 until a predetermined pressure has been attained in the upper end of the respective platen cylinder 26, for example 40 pounds per square inch. Also, each of the lines 34, leading to the lower ends of the platen cylinders 26, is provided with a sequence valve 106 and 107, respectively, and a speed control valve 108 and 109, respectively, to control the flow of air to and from the respective cylinders. These valves are well known in the art and in their action the air flow is controlled in the direction of the arrows shown on the respective valves. The air flow in the direction opposite the arrows is free and uncontrolled.

As the table 1 rotates to shift a loaded section to the heating or glue setting station (to the right in Fig. 11) the center valve 100 is operated to connect the outlet 101 with the air supply line 103. The air enters the top end of the right cylinder 26 and the respective platen B is pushed to its lowered or clamping position while air is bled from the bottom end of the cylinder through the connection 34 leading to the line 102 which has been opened to atmosphere by the valve 100. The fall of the platen B is cushioned by restricting the flow of bleed air through the speed control valve 109.

When the right hand platen B reaches clamping position the air pressure at the top of the respective cylinder 26 builds up to apply clamping pressure on the work and when the air pressure reaches 40 pounds per square inch the sequence valve 104 opens to pass air to the left side of the horizontal cylinder 35 which is then actuated to the right. Simultaneously the sequence valve 106, in the line 34 leading to the bottom end of the left hand platen cylinder 26, opens to actuate the left hand cylinder and elevate the respective platen B.

When the table is next rotated the positions of the outlets 101 and 102 are shifted relative to the valve 100 and the air pressure flow to the several cylinders is conducted through line 102 and its branches and control valves 105 and 107 in the same manner as was described for the line 101. The valve 108 then cushions the fall of the respective platen and the line 101 becomes the bleed line.

In the operation of the gluing machine the open platens at the loading station are loaded by the operator who places the work in proper position. The work surfaces to be joined are coated with wet thermosetting glue and when the pieces have been properly positioned the operator actuates the table drive control valve 68 which causes the clutch cylinder 8 to shift the clutch into driving engagement with the driving cup 70. The table then rotates to move the loaded section to the glue setting station and the clamping means are automatically actuated as before described. As the newly loaded section approaches the heating station the clutch is shifted to neutral position, by engagement of the valve shoe 96 with the first control valve 97, and its momentum begins to drop until the heating station is reached where, by engagement of the valve shoe 90 with the valve 89, the clutch is shifted to braking position and the table movement is stopped. At this point the electrical contact shoes 49 and 50 are engaged with the contact bars 54 and 55 and the connection with the high frequency oscillating apparatus is complete.

The oscillating equipment is automatically controlled, as will be understood, to energize the electrodes in the platens A and B only when the table has reached its final position at the heating station, suitable switches being provided for operation by the table for that purpose. Also suitable safety means, not shown, are provided to prevent operation of the oscillator when there is any accidental override of the table and when the table is in motion. Suitable timing devices are provided to regulate the oscillator and automatically shut off the high frequency circuit after a predetermined period of operation sufficient to heat and set the glue. This is an established practice in the art, however, and need not be further described.

Generally the time required to heat and set the glue is very short and is less than the time required for the operator to remove the finished work and load the machine with new work. Thus the oscillator will be automatically shut off when the loading operation is completed and it is only necessary for the operator to then actuate the valve 88 and shift the loaded section to the heating station.

It will be understood that when necessary the platens A and B at each section of the machine, may be completely shielded to avoid interference from high frequency radiations at the corners or edges of the metal platen parts. Such shielding may be in the form of aluminum side plates, extending from the top of platen B and from the bottom of platen A, arranged to overlap each other when the platens are closed in clamping position. These plates will extend across the front of the platens and along each side and the side plates of platen A will be extended to bridge the gap between the platens at each end of the row of horizontal clamp cylinders. Such shielding is not shown, except in Fig. 4 where it is indicated at 110 and 111. This figure however, will clearly demonstrate the manner in which the shielding may be mounted.

The main advantages of this invention reside in the arrangement for translation of complete working sections of the machine from station to station for successive operations which are automatically performed while the operator, standing at one station only, merely loads and unloads the machine sections as they are brought to his station; and in the arrangement whereby both vertical and lateral power actuated clamping of the work is done automatically and in predetermined timed relation while the machine sections are being shifted between stations.

Other advantages are to be found in the simple and efficient arrangement and operation of the high frequency oscillating equipment and the platen electrodes whereby the energizing of the platen electrodes is automatically controlled and the machine, being completely grounded, is safe for operations at the loading station during the heating process. Further advantages are found in the simple and convenient arrangement of the table drive whereby the operator is only required to momentarily operate a starting valve when loading is completed and wherein the table is stopped automatically at the desired position.

And still further advantages reside in the high speed of operation of the improved gluing machine and the greatly increased output of finished products that can be obtained with but one operator.

Although but one specific embodiment of this invention is herein shown and described it will be understood that details of the construction shown may be altered or omitted without departing from the spirit of this invention as defined by the following claims.

I claim:

1. A gluing machine comprising a carrier platen, a clamping platen disposed above said carrier platen, power means for raising and lowering said clamping platen relative to said carrier platen, said power means being adapted to apply clamping pressure when said clamping platen is in lowered position, independent clamp means disposed to act laterally between said platens, means for operating said independent clamp means, and control means responsive to pressure applied to said clamping platen for actuating the last named means after the clamping platen is in lowered position.

2. A gluing machine comprising a carrier platen, a clamping platen disposed above said carrier platen, power means for raising and lowering said clamping platen relative to said carrier platen, said power means being adapted to apply clamping pressure when said clamping platen is in lowered position, independent clamp means disposed to act laterally between said platens, means for operating said independent clamp means, control means responsive to a predetermined pressure applied to the clamping platen by said power means for actuating said clamp operating means in predetermined retarded relation with respect to the clamping platen, and means carried by said platens for heating the work held therebetween.

3. A gluing machine comprising a carrier platen and a clamping platen disposed one above the other, power means to raise and lower one of said platens relative to the other and to force said one platen toward the other in clamping relation, a stop member mounted on the upper face of said carrier platen and disposed along one margin thereof, independent clamp means disposed at the opposite margin of the upper face of said carrier platen and arranged to act across said platen in the direction toward said stop member, and control means responsive to clamping pressure of said power means for actuating said independent clamp means automatically in timed relation with the clamping operation of said platens.

4. A gluing machine comprising a rotatable table having a plurality of horizontal carrier platens disposed in angularly spaced relation about the center of table rotation, a clamping platen disposed above each carrier platen and supported from said table, said clamping platens being mounted for movement toward and away from the respective carrier platen and arranged for face to face coaction therewith, pneumatic means for raising and lowering said clamping platens respectively, said means being adapted to apply downward pressure on the respective clamping platen when the same is in lowered position, means for rotating said table in predetermined increments of angular movement, means for actuating said pneumatic means in predetermined sequence upon rotation of said table from one position to another, independent pneumatic clamp means mounted to act laterally between coacting platens, and control means for said clamp means adapted to actuate said clamp means after the respective clamping platen is in lowered clamping position.

5. A gluing machine comprising a rotatable table having a plurality of horizontal carrier platens disposed in angularly spaced relation about the center of table rotation, a clamping platen disposed above each carrier platen and supported from said table, said clamping platens being mounted for movement toward and away from the respective carrier platen and arranged for face to face coaction therewith, operating means for raising and lowering each of said clamping platens, said means being adapted to apply downward pressure on the respective clamping platen when the same is in lowered position, independent clamp means adapted to act laterally between each pair of coacting platens, means for rotating said table in predetermined increments of angular movement, control means for actuating said operating means respectively at predetermined periods in the cycle of table rotation, and means for actuating said clamp means after the respective clamping platen is in lowered clamping position and during the application of downward clamping pressure thereon.

6. A gluing machine comprising a rotatable table having a pair of horizontal carrier platens disposed one on each side of the center of table rotation, a clamping platen disposed above each carrier platen and mounted for vertical movement toward and away from the respective carrier platen, pneumatic power means arranged to raise and lower each of said clamping platens and to apply downward pressure thereto when in lowered position, horizontally acting pneumatic clamp means disposed between said carrier platens and arranged to act alternately between coacting carrier and clamping platens, means to rotate said table intermittently in one-half revolution increments of angular movement, and control means arranged to actuate said power means automatically to raise one clamping platen and lower the other as said table is rotated from one position to another and to actuate said clamp means toward the lowered platen.

7. A gluing machine comprising a rotatable table having a pair of horizontal carrier platens disposed one on each side of the center of table rotation, a clamping platen disposed above each carrier platen and mounted for vertical movement toward and away from the respective carrier platen, pneumatic power means arranged to raise and lower each of said clamping platens and to apply downward pressure thereto when in lowered position, horizontally acting pneumatic clamp means disposed between said carrier platens and arranged to act alternately between coacting carrier and clamping platens, means to rotate said table intermittently in one-half revolution increments of angular movement, control means arranged to actuate said power means to lower one clamping platen and raise the other clamping platen and to actuate the clamp means toward the lowered platen, and means arranged to automatically retard the operation of the clamp means and the raising action of said other platen until the first platen has reached its lowered position.

8. A gluing machine comprising a rotatable support having a pair of horizontal carrier platens mounted respectively on opposite sides of the center of rotation of said support, a clamping platen disposed above each carrier platen and mounted for vertical movement toward and away from the respective carrier platen, power means for raising and lowering each of said clamping platens and adapted to apply downward pressure thereto when in lowered position, horizontally directed double acting clamp means disposed between said carrier platens and adapted to act alternately between coacting carrier and clamping platens, means for rotating said support intermittently in one-half revolution increments of angular movement, and control means for actuating said power means automatically to raise one clamping platen and lower the other upon movement of said support from one position to another and adapted to actuate said clamp means toward the lowered platen during the application of downward pressure thereto.

9. A gluing machine comprising a rotatable support having a pair of horizontal carrier platens disposed in parallel relation one on each side of the center of rotation of said support, a clamping platen disposed above each carrier platen and mounted for vertical movement toward and away from the respective carrier platen, power means for raising and lowering each of said clamping platens and adapted to apply downward pressure thereto when in lowered position, a plurality of horizontally directed double acting clamp means mounted on said support between said carrier platen and adapted to act alternately between coacting carrier and clamping platens, means for rotating said support intermittently in one-half revolution increments of angular movement, control means for actuating said power means to lower one clamping platen and raise the other clamping platen and adapted to actuate said clamp means toward the lowered platen, and means for automatically retarding the operation of the clamp means and the raising action of said other platen until the first platen has reached its lowered position.

RUDOLPH F. ONSRUD.

REFERENCES CITED

The following references are of record in the file of this patent:

UNITED STATES PATENTS

| Number | Name | Date |
|---|---|---|
| 965,927 | Nichols | Aug. 2, 1910 |
| 1,154,730 | Runne | Sept. 28, 1915 |
| 2,231,457 | Stephen | Feb. 11, 1941 |
| 2,291,471 | Hopkins | July 28, 1942 |
| 2,317,281 | Linquist | Apr. 20, 1943 |
| 2,344,488 | Bowling | Mar. 21, 1944 |
| 2,434,573 | Mann | Jan. 13, 1948 |
| 2,439,918 | Auxier | Apr. 20, 1948 |
| 2,441,699 | Gramelspacher | May 18, 1948 |
| 2,453,185 | Bilhuber | Nov. 9, 1948 |
| 2,457,498 | Russell et al. | Dec. 28, 1948 |